(12) United States Patent
Luca Marques de Almeida et al.

(10) Patent No.: US 12,549,607 B2
(45) Date of Patent: Feb. 10, 2026

(54) ZERO TRUST POLICY RECOMMENDATION SYSTEM THROUGH ENTITY AND RELATIONSHIP SIMILARITY

(71) Applicant: Dell Products L.P., Round Rock, TX (US)

(72) Inventors: Thais Luca Marques de Almeida, São Gonçalo (BR); David Burth Kurka, Campinas (BR); Diego Vrague Noble, Pelotas (BR); Ítalo Gomes Santana, Rio de Janeiro (BR); Karen Braga Enes, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 18/544,306

(22) Filed: Dec. 18, 2023

(65) Prior Publication Data
US 2025/0202949 A1 Jun. 19, 2025

(51) Int. Cl.
*H04L 9/40* (2022.01)
(52) U.S. Cl.
CPC ................... *H04L 63/20* (2013.01)
(58) Field of Classification Search
CPC ...................................................... H04L 63/20
USPC ............................................. 726/1; 709/223
See application file for complete search history.

(56) References Cited

U.S. PATENT DOCUMENTS

| 11,880,452 | B1* | 1/2024 | Guha | G06N 3/08 |
| 11,943,195 | B1* | 3/2024 | Jain | H04L 63/0272 |
| 12,153,948 | B2* | 11/2024 | Kaimal | H04L 63/108 |
| 2021/0168150 | A1* | 6/2021 | Ross | G06F 16/9024 |
| 2022/0109701 | A1* | 4/2022 | Zeng | H04L 63/205 |
| 2023/0254318 | A1* | 8/2023 | Hu | G06F 21/604 726/1 |

OTHER PUBLICATIONS

He et al "A survey on zero trust architecture: Challenges and future trends," Wireless Communications and Mobile Computing, 2022.
S. Fortunato, "Community detection in graphs," Physics Reports, No. 3-5, pp. 75-174, 2010.
Su et al., "A Comprehensive Survey on Community Detection With Deep Learning," IEEE Transactions on Neural Networks and Learning Systems, pp. 1-21, 2022.

* cited by examiner

*Primary Examiner* — Liang A Wang
(74) *Attorney, Agent, or Firm* — Workman Nydegger

(57) ABSTRACT

One example method includes transforming a structured data file into a graph structure that represents a zero trust (ZT) environment, where entities in the ZT environment are represented as nodes in the graph structure, and connections between the entities are represented in the graph structure as edges, performing a community detection process on the graph structure to identify a community of entities, performing a community characterization process that comprises identifying the ZT policies that are most commonly applied to the entities in the community, and based on the ZT policies identified, generating a recommendation as to whether one of the ZT policies should be applied to one of the entities in the community and, if so, which ZT policy or ZT policies should be applied.

20 Claims, 4 Drawing Sheets

1. for each $C_i \in C$ do
2.     $rank \leftarrow \emptyset$;
3.     $w \leftarrow \emptyset$
4.     for each $v \in C_i$ do
5.         $z \leftarrow f_\emptyset (v)$;
6.         $rank \leftarrow g_\emptyset (z, rank)$;
7.     for each $v \in C_i$ do
8.         $w \leftarrow w \cup (rank)$;
9.         $h_\emptyset (w,v)$;
FIG. 3
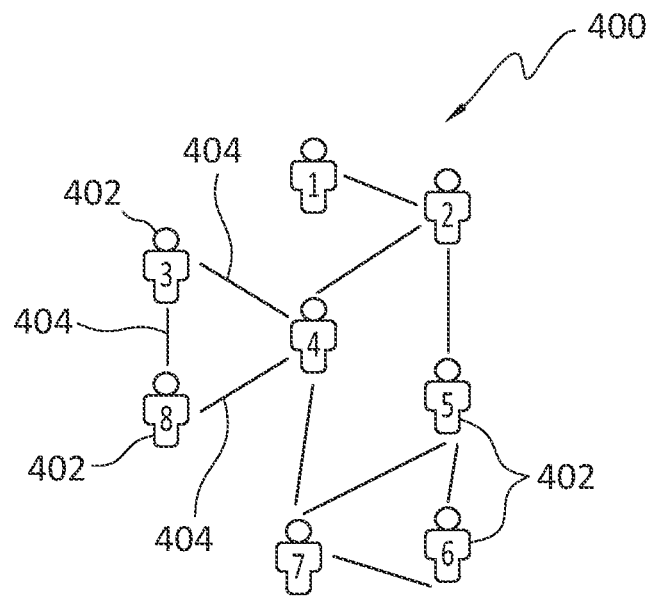
FIG. 4
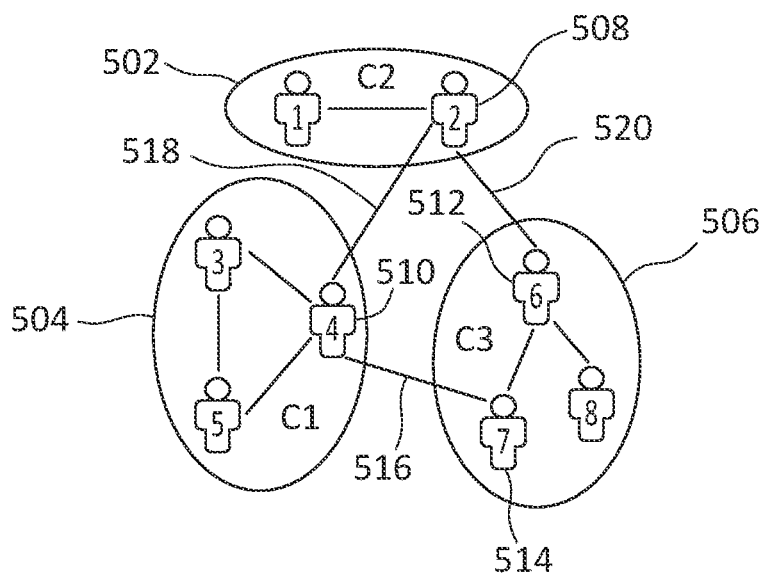
FIG. 5

| | |
|---|---|
| $Entity_1$ | $\{P_1, P_2, P_4, P_5, P_7, P_9, P_{10}\}$ |
| $Entity_2$ | $\{P_2, P_3, P_9\}$ |
| $Entity_3$ | $\{P_1, P_5, P_7, P_{10}\}$ |
| $Entity_4$ | $\{P_2, P_5, P_7, P_{10}\}$ |
| $Entity_5$ | $\{P_2, P_3, P_4, P_9\}$ |
| $Entity_6$ | $\{P_1, P_4\}$ |
| $Entity_7$ | $\{P_1, P_2, P_4, P_7, P_9\}$ |
| $Entity_8$ | $\{P_1, P_{10}\}$ |

ZERO TRUST POLICY RECOMMENDATION SYSTEM THROUGH ENTITY AND RELATIONSHIP SIMILARITY

FIELD OF THE INVENTION

Embodiments of the present invention generally relate to zero trust frameworks and operations. More particularly, at least some embodiments of the invention relate to systems, hardware, software, computer-readable media, and methods, for identifying and recommending zero trust policies for a new member of a zero trust environment.

BACKGROUND

Zero Trust (ZT) is a paradigm of cybersecurity that is based on the principle of "never trust, always verify." Zero Trust Architectures (ZTAs) may require a Security Orchestration, Automation, and Response (SOAR) system that is responsible for coordinating security in an automated manner and verifies the communication patterns within the entire ZT environment. This system relies heavily on a set of policies that must be domain-adequate and define valid communications, standards, and operational aspects of a ZT environment.

A current challenge with respect to these systems is that, besides defining a well-established set of policies, this set of policies must be kept updated and aligned with a dynamic environment. This is especially so for large and complex organizations that have inventories and policies in numbers beyond the manual capacity. ZT relies on least privileged access, so policies are applied according to a detected activity. Thus, the chances of missing policies to protect each entity in ZTAs should be mitigated as soon as possible.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses an example algorithm for evaluating communities for policy applicability, according to one embodiment.

FIG. 4 discloses an example of a ZTA environment modeled as a graph, according to one embodiment.

FIG. 5 discloses an example of communities detected in a given ZTA environment, according to one embodiment.

DETAILED DESCRIPTION OF SOME EXAMPLE EMBODIMENTS

Figures 1, 2:
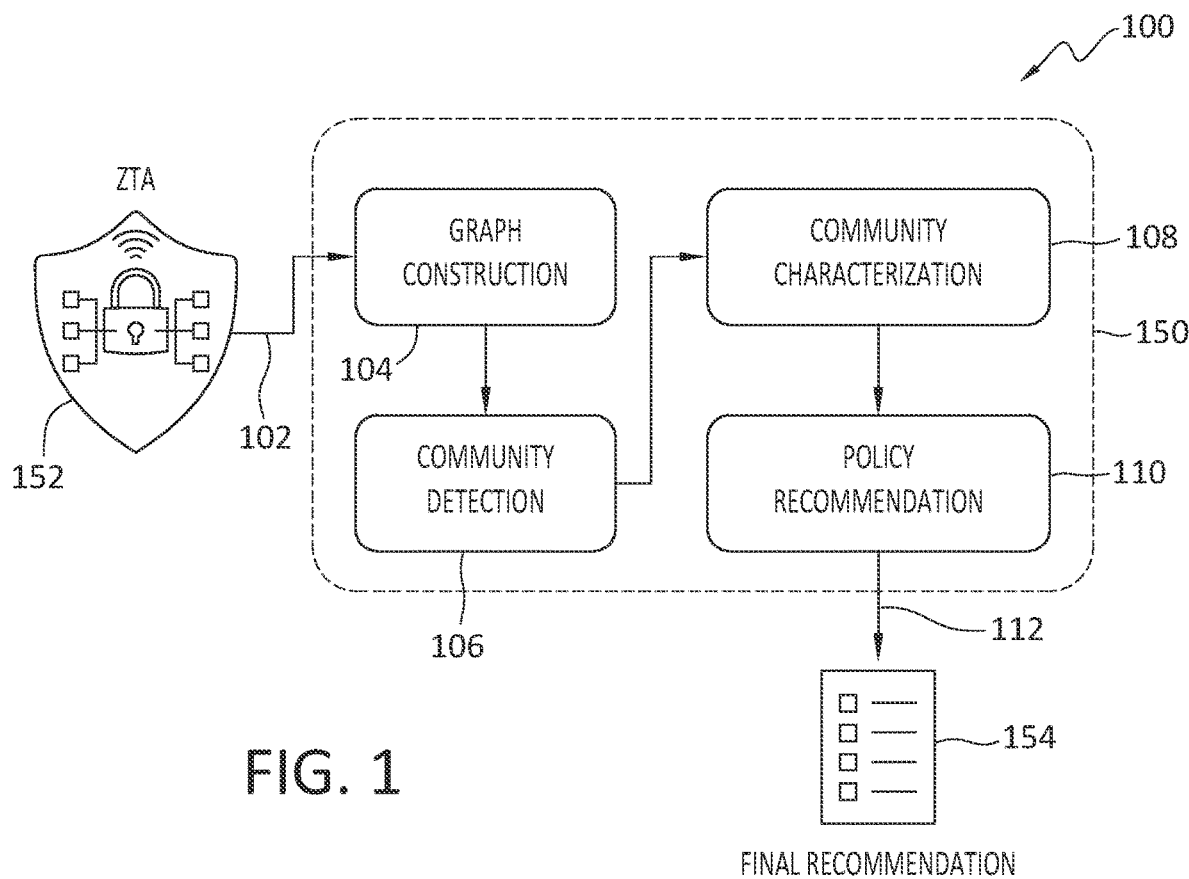
FIG. 1 discloses aspects of a method, according to one embodiment.
FIG. 2 discloses aspects of an example .json file that encodes a network given as input, according to one embodiment.

Embodiments of the present invention generally relate to zero trust frameworks and operations. More particularly, at least some embodiments of the invention relate to systems, hardware, software, computer-readable media, and methods, for identifying and recommending zero trust policies for a new member of a zero trust environment.

One example embodiment is directed to a method that may comprise transforming a representation of a ZT environment into a graph structure. A community detection process may then be applied to the graph structure to partition the graph structure into sub-graphs that each define a respective community. Next, a community characterization process may be performed in which those ZT policies most commonly or relevant applied to members of a community are retrieved. Finally, these ZT policies may be ranked, and the ranking may serve as a basis for a recommendation as to which ZT policy, or policies, should be applied to one or more current, and/or new, member(s) of the community.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that applicable ZT policies may be automatically applied to a member, such as a new member for example, of a community in a ZT environment. An embodiment may, in applying a ZT policy to a member of a community, leverage knowledge about policies that have been applied to one or more other members of that community. Various other advantages of one or more example embodiments will be apparent from this disclosure.

A. Context for an Example Embodiment

The following is a discussion of aspects of example context for various embodiments of the invention. This discussion is not intended to limit the scope of the invention, or the applicability of the embodiments, in any way.

A.1 Zero Trust (ZT) Architecture

Zero Trust (ZT) is a cybersecurity approach that aims at continuously verifying network activity, as disclosed in "He, Y., Huang, D., Chen, L., Ni, Y., & Ma, X., 'A survey on zero trust architecture: Challenges and future trends,' Wireless Communications and Mobile Computing, 2022," which is incorporated herein in its entirety by this reference. ZT focuses on users, assets, and resources, and relies on the paradigm of "never trust, always verify." Zero Trust Architectures (ZTAs) are IT (information technology) infrastructures that comply with ZT requirements. One of the components of a ZTA is the Security Orchestration, Automation, and Response (SOAR) system, which is responsible for verifying all network traffic by taking policy-based actions across the network. According to ZT precepts, policies must be domain-adequate and ensure valid communications, standards, and operational aspects of the application environment. These policies are applied by the Policy Enforcement Points (PEPs). However, keeping a set of policies updated is challenging as the configuration of the network evolves. Thus, an embodiment comprises a mechanism for enforcing a set of policies by relying on CD (community detection) techniques. In ZTAs, PEP is responsible for granting or denying access based on a set of policies, where examples of ZT pillars include, but are not limited to, user, device, network, application, and data. Nonetheless, an embodiment may be agnostic in terms of which pillar an activity is being parsed, and from which pillar the input information is coming from.

A.2 Community Detection

The objective of CD algorithms is to partition networks, which may be represented as graphs, into groups of vertices or subgraphs according to similarity measures by relying on the graph topology. These subgraphs are sometimes referred to as communities or clusters. The output of a CD algorithm is a set of subgraphs, in which nodes from the same community are densely connected, that is, the nodes have maximal similarity to each other, while nodes from different communities are less connected, that is, these nodes have less, relative to the maximum, or no, similarity to each other. CD identifies modules and their hierarchical organization, allowing for classifying vertices based on their structural position in the modules. According to the communities found by the algorithm, nodes that share many edges with other groups may have an important function of control and stability within the group; and nodes at the boundary of a community may work as mediators and leaders for exchanges between different communities. The following references, incorporated herein in their respective entireties by this reference, include further information about community detection: [1] "S. Fortunato, 'Community detection in graphs,' Physics Reports, no. 3-5, pp. 75-174, 2010; and [2]" Xing, S., Shan, X., Fanzhen, L., Jia, W., Jian, Y., Chuan, Z., . . . & Yu, P. S., 'A Comprehensive Survey on Community Detection With Deep Learning,' IEEE Transactions on Neural Networks and Learning Systems, pp. 1-21, 2022."

B. Overview of Aspects of an Example Embodiment

One example embodiment comprises a mechanism for improving and updating a set of policies dynamically by providing a recommendation system mechanism that suggests suitable policies for a given entity based on similarities to other entities within a community. As such, an embodiment may recommend policies that are aligned with the policies defined for a given entity. As well, an embodiment may operate to leverage policies suggestions to improve a ZTA policy set based on communities that the entities belong to.

In more detail, an embodiment may comprise a method that suggests suitable policies for a given entity based on the policies applied to similar entities, enabling timely adaptation and updates of policies to improve the SOAR system. One embodiment of the method may be based on various assumptions:

1. There is an existing ZTA in place, and an operational set of policies applied to the system's activities—within the context of one embodiment, the environment is described by its conceptual level of its entities and their relationships, which do not depend on ZT pillars and can be leveraged from multiple resources, such as users, devices, network, applications, and data;
2. similar entities belong to the same community and similar entities are likely to hold policies in common;
3. ZTA entities may be modelled as nodes in a graph; and
4. policies may be assigned to nodes in the network according to their attributes—contrariwise to the common use of roles that carry pre-selected policies, an embodiment may assume each node has its respective set of policies.

With these considerations in view, an embodiment may perform an analysis of the system data on a graph, which is subject to the application of community detection (CD) techniques to group similar entities. Then, new policies may be suggested to individual entities based on policies already applied in the same group, enabling consistent updates of policies in the policy allocations of the entire system. Other than a consistent policy distribution, these recommendations can eventually be used to detect anomalies over communities as well.

One example embodiment may comprise the following operations:

1. graph construction—parse and represent existing policies and the description of the current ZTA using a graph structure to handle large and intricate relationships among participating entities. In the resulting graph, system entities are represented as nodes, and their relationships, for example, system connections, interactions, shared information, service usage patterns, as edges;
2. community detection—employ a community detection algorithm to partition the graph into groups (or communities) of entities (nodes) according to their connections (edges) and attributes;
3. community characterization—for each community, retrieve the most relevant and common policies related to its members; and
4. policy recommendation—for each entity belonging to a community, verify if all retrieved policies (3. above) are in effect—in case some policies are missing, recommend those sorted by their popularity and/or relevance in the community.

Thus, an embodiment may comprise various useful aspects. For example, a method according to one embodiment may recommend policies for ZT entities using a community-based approach. For each community, the recommended policies consider the set of policies already applied on the entities of the very same community and ranked according to a given criteria. So far, this is a new approach towards Zero Trust automation.

As another example, a method according to one embodiment may improve the consistency and robustness of a ZT architecture, relative to what the consistency and robustness would be absent the implementation of the embodiment, by providing administrators with a low-cost and automatic data-driven solution to suggest policy applications to each graph entity.

As final example, an embodiment is not limited to a specific Zero Trust Pillar. Thus, the embodiment may be applied to diverse sets of ZT scenarios that do not rely on traditional perimeters.

C. Detailed Discussion of Aspects of an Example Embodiment

One example embodiment comprises a method that relies on CD algorithms to split a given network into clusters of nodes, where each node is suggested to policies based on other nodes of its same community. FIG. 1 discloses an example method 100 according to one embodiment.

Initially, a computing system 150 configured to perform the method 100 receives 102 input 152, such as in the form of a structured data file, such as a JSON (JavaScript object notation) file for example, containing information about a ZTA environment, a conceptual level description of every entity, such as users, applications, and/or other entities, presented and how the entities relate to each other. This file may contain properties of such entities and their types along with how these entities may relate to each other.

Next, the representation of the ZT environment entities and relations may be translated 104 into a graph structure. A CD technique may then be applied 106 to partition the resulting graph into subgraphs. Next, a community characterization operation may be performed 108 in which the most common policy, or policies, applied to members of the same community are retrieved. Finally, in an embodiment, a policy recommendation operation may be performed 110 which ranks the most common policies of a community based on a given criteria and outputs 112 a recommendation 154, comprising the most common policies, to each entity of the same community. Each of the example operations of the method 100 are discussed in further detail below.

C.1 Parsing and Representation

Given an input file, such as the input 152 of FIG. 1 for example, an embodiment may transform the input into an undirected graph that represents the input. In an embodiment of this graph, each node represents an entity, and two nodes are connected by an edge if they are related. Within the context of ZT, nodes may be connected if they exchange some information between each other, for instance.

Taking a JSON file as an example, entities in a ZT environment may be represented by respective objects, using a unique identifier as key and, if needed, containing some properties as values such as labels or some metadata. Edges between nodes can be described as an array of objects with properties 'source,' and 'destination,' and associated semantics type. In this file, all nodes may be declared first, so the system can load the nodes in memory and finally create edges among them. FIG. 2 presents an example of an input JSON file 200 that encodes a network. Many different forms can be used to represent policies, such as declarative statements and logical rules. As an example, one way of relating policies and entities is by representing policies as logical rules. In this case, each entity may have a type associated with it which corresponds to the types of arguments in logical rules.

C.2 Community Detection

Once the graph is built, a CD operation may be performed. As discussed earlier, a CD algorithm may aim at partitioning a given graph into groups of nodes using their relationships and similarity measures. As a result, community nodes may tend to be densely connected to nodes within the community, while nodes of different communities tend to be sparsely connected to each other, if at all. The choice of a CD algorithm on a ZTA application may consider various aspects to keep the whole solution consistent in terms of policy updates, performance, and evaluation.

To illustrate, let G=(V, E) be a graph where V is the set of nodes v (vertices) and E is the set of edges connecting the nodes v. In this example, the graph G contains k communities $C=\{C_1, C_2, \ldots, C_k\}$, where $C_i$ is a densely connected subgraph that belongs to G. A community detection algorithm, therefore, works as a mapping function that assigns every $v_i \in V$ to at least one of the k communities. In the context of ZTAs, an embodiment may assume that the same $v_i$ may participate in more than one community, in other words, there may exist $C_i$ and $C_j$ such that i≠j and $C_i \cap C_j \neq 0$.

C.3 Community Characterization and Policy Recommendation

After splitting the network into communities, a method according to one embodiment may retrieve policies applied to each community member by following a given criteria. In an embodiment, this may be done by visiting each community and its members, followed by applying a ranking function to determine the most relevant policies. Formally, consider C as the set of communities detected, and v as a node that belongs to a community in C. Let $f_\theta$ be a function that selects the desired policies given v, $g_\theta$ be a ranking function for a given set of policies, and $h_\theta$ be a function that recommends a set of policies to v. An example algorithm 300 for performing these operations is disclosed in FIG. 3.

In the algorithm 300, each community is independently evaluated for the policy application (lines 1-9). As shown, for all $v \in C_i$ (lines 4-6) such that $C_i \in C$, the set of policies applied to v is stored into z followed by incorporating z is into the current rank of policies. Next, the most relevant policies 'rank' are recommended to every $v \in C_i$ (lines 7-9). Note that, in an embodiment, the set of policies does not need necessarily be applied to each node, but instead serves as a recommendation procedure to every node. That is, application of the set of policies may, or may not, be performed. In an embodiment, application of the set of policies may be performed automatically or, alternatively, may be delegated to a human specialist to apply the most adequate policies to the SOAR component of the ZT architecture.

The example algorithm 300 may be modified to meet specific aspects and requirements of a given set of circumstances. For performance, the scalability of the algorithm may be enhanced by employing a node sampling regime in each community to reduce the number of evaluated nodes. For example, the algorithm may sample a certain number of nodes from $C_i$ according to a ratio of $|C_i|$.

In versatility terms, any criteria, such as a threat level for example, may be applied while retrieving policies in $f_\theta$. The same reasoning also applies to recommend such policies to community nodes as some nodes may hold a less representative role in the community and, therefore, some policies should, or should not, be applied to them. For instance, one embodiment comprises applying random walks for selecting nodes within a community. Then, the most popular policies of each community can be kept and used to help make determinations as to which policies should be applied to a particular node, or group of nodes, in a community. For each node, the algorithm may recommend the top-k most popular policies, where k is a user-defined hyperparameter.

D. Hypothetical Use Case

Consider the following scenario to exemplify one example embodiment. In particular, suppose there is a ZTA governing the authentication system of a company, and this company has decided to periodically verify the current ZT policies to enforce some security points based on a network environment. A graph 400 modeled as the current ZTA environment is presented in FIG. 4, in which entities of the ZTA environment are represented by nodes 402 while the connections between the entities are represented by edges 404. The communities detected by a CD operation are disclosed in FIG. 5.

In particular, FIG. 5 discloses communities 502, 504, and 506, detected in the graph 400 of FIG. 4 which, as noted earlier, represents a ZTA environment. As shown in FIG. 5, the entities represented by nodes 508, 510, 512, and 514, may be in different respective communities, but may nonetheless connect to each other, as evidenced by the edges 516, 518, and 520.

Figures 6, 7:
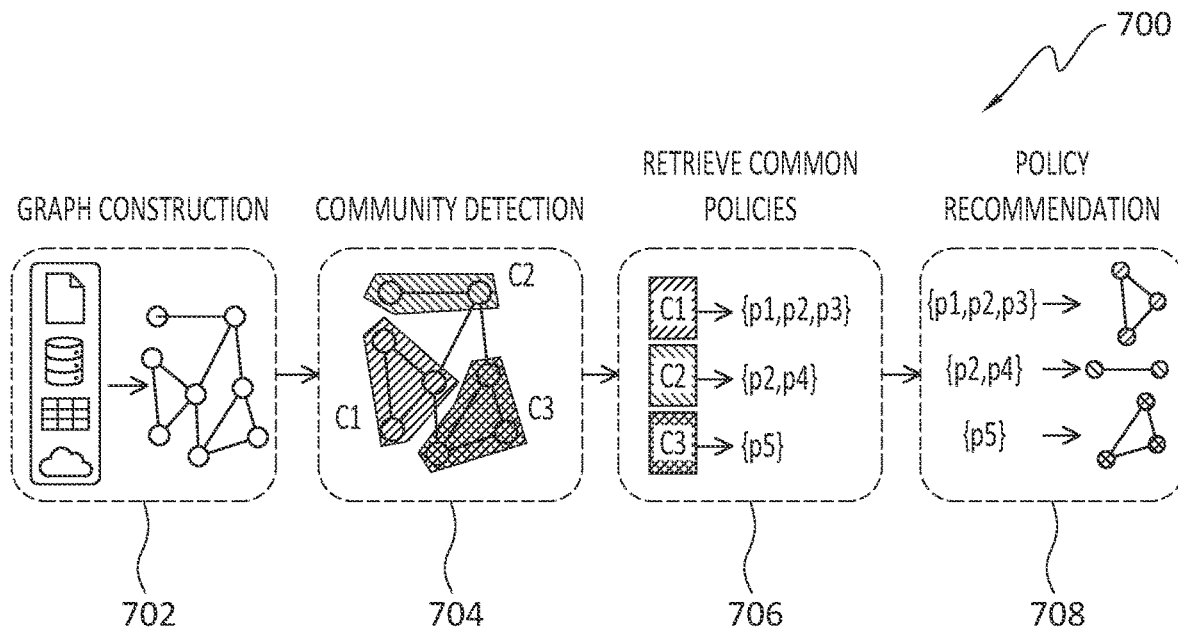
FIG. 6 discloses a set of ZT policies applied to one or more entities, according to one embodiment.
FIG. 7 discloses a scheme according to one embodiment.

In this example, a set of policies applied to each entity is presented in a Table 600 disclosed in FIG. 6. Here, suppose it is decided to enforce policies for $Entity_8$, which belongs to community $C_1 = \{Entity_3, Entity_4, Entity_8\}$. After collecting all policies from the nodes of $C_1$, the most popular ones, included in both, $Entity_3$ and $Entity_4$, are $\{P_5, P_7, P_{10}\}$. Thus, as $Entity_8$ already has policy $P_{10}$ implemented, an embodiment may suggest policies $P_5$ and $P_7$ to be applied to $Entity_8$. Note that $P_2$ may not be recommended for $Entity_8$ because $P_2$ only applies to $Entity_4$ and $P_1$ may not be recommended as it already applies to $Entity_8$.

With reference finally to FIG. 7, there is presented an overview of an embodiment of a method 700, various example operations of which were described earlier herein. In an embodiment, a recommendation may only be made, and implemented, after the most common or relevant policies are retrieved from their respective communities.

Thus, the example method 700 may begin with graph construction 702, and the graph may then be partitioned into sub-graph portions, that represent respective communities, as part of a CD operation 704. One or more policies commonly applicable to one or more of the communities may then be identified and retrieved 706. A recommendation may then be made 708 as to which, if any, policies should be applied to one or more of the communities.

E. Example Methods

It is noted with respect to the disclosed methods, including the example methods and algorithms of FIGS. 1-3 and 7, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: transforming a structured data file into a graph structure that represents a zero trust (ZT) environment, wherein entities in the ZT environment are represented as nodes in the graph structure, and connections between the entities are represented in the graph structure as edges; performing a community detection process on the graph structure to identify a community of entities; performing a community characterization process that comprises identifying the ZT policies that are most commonly applied to the entities in the community; and based on the ZT policies identified, generating a recommendation as to whether one of the ZT policies should be applied to one of the entities in the community and, if so, which ZT policy or ZT policies should be applied.

Embodiment 2. The method as recited in any preceding embodiment, wherein the community detection process comprises partitioning the graph structure into sub-graph portions that each represent a respective group of the entities in the ZT environment.

Embodiment 3. The method as recited in any preceding embodiment, wherein the recommendation comprises a recommendation that a particular one of the most relevant policies be applied to an entity to which that particular policy has not yet been applied, and the particular one of the most relevant policies is identified by application of specified criteria.

Embodiment 4. The method as recited in any preceding embodiment, wherein one of the entities comprises any one or more of a user, a device, a network, and an application.

Embodiment 5. The method as recited in any preceding embodiment, wherein entities within the community are more densely connected to each other than to other entities in a different community.

Embodiment 6. The method as recited in any preceding embodiment, wherein entities within the community have one or more relationships with each other that comprise one or more system connections, interactions, shared information, and service usage patterns.

Embodiment 7. The method as recited in any preceding embodiment, wherein a check is performed of the identified ZT policies to determine whether all of the identified ZT policies are in effect across the entities in the community.

Embodiment 8. The method as recited in any preceding embodiment, wherein the ZT environment represented by the graph structure comprises a network.

Embodiment 9. The method as recited in any preceding embodiment, wherein, in the structured data file, the nodes are declared before the edges.

Embodiment 10. The method as recited in any preceding embodiment, wherein the community characterization process comprises visiting the community and one or more other communities represented in the graph structure, and then applying a ranking function to identify the most relevant, or most commonly applied, ZT policies.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
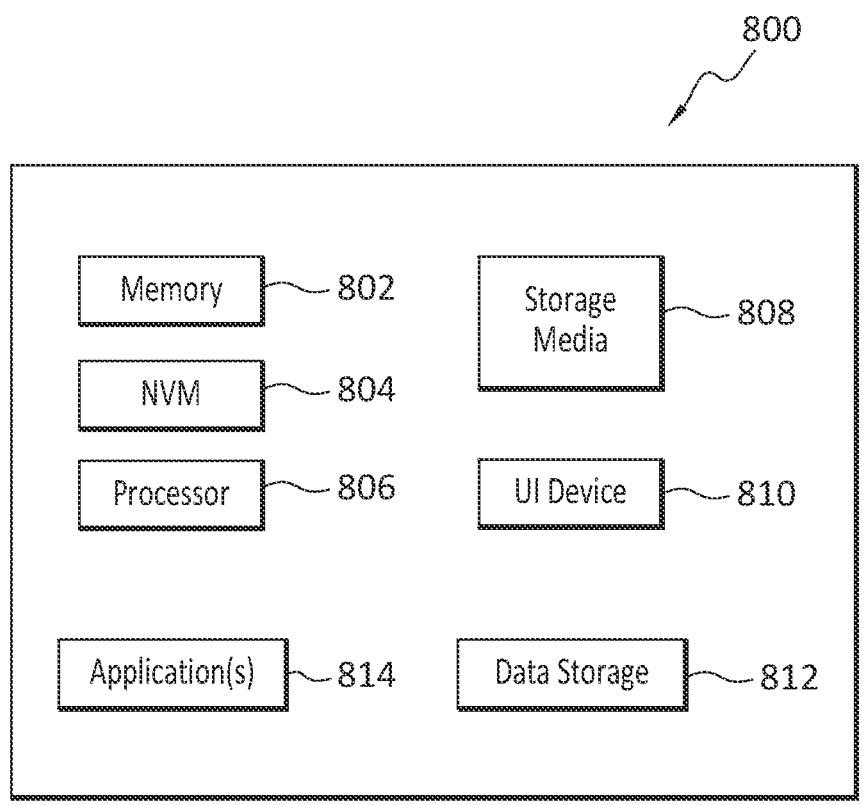
FIG. 8 discloses a computing entity configured to perform any of the disclosed methods, steps, processes, and operations.

With reference briefly now to FIG. 8, any one or more of the entities disclosed, or implied, by FIGS. 1-7, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the methods, processes, operations, and portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   transforming a structured data file into a graph structure that represents a zero trust (ZT) environment, wherein entities in the ZT environment are represented as nodes in the graph structure, and connections between the entities are represented in the graph structure as edges;
   performing a community detection process on the graph structure to identify a community of entities, and the community detection process comprises partitioning the graph structure into sub-graphs that each define a respective community;
   performing a community characterization process that comprises identifying ZT policies that are most relevant, or most commonly applied, to the entities in the community; and based on the ZT policies identified, generating a recommendation that one of the ZT policies should be applied to one of the entities in the community and, identifying which ZT policy or ZT policies should be applied.

2. The method as recited in claim 1, wherein the community detection process comprises partitioning the graph structure into sub-graph portions that each represent a respective group of the entities in the ZT environment.

3. The method as recited in claim 1, wherein the recommendation comprises a recommendation that a particular one of the most relevant policies be applied to an entity to which that particular policy has not yet been applied, and the particular one of the most relevant policies is identified by application of specified criteria.

4. The method as recited in claim 1, wherein one of the entities comprises any one or more of a user, a device, a network, and an application.

5. The method as recited in claim 1, wherein entities within the community are more densely connected to each other than to other entities in a different community.

6. The method as recited in claim 1, wherein entities within the community have one or more relationships with each other that comprise one or more system connections, interactions, shared information, and service usage patterns.

7. The method as recited in claim 1, wherein a check is performed of the identified ZT policies to determine whether all of the identified ZT policies are in effect across the entities in the community.

8. The method as recited in claim 1, wherein the ZT environment represented by the graph structure comprises a network.

9. The method as recited in claim 1, wherein, in the structured data file, the nodes are declared before the edges.

10. The method as recited in claim 1, wherein the community characterization process comprises visiting the community and one or more other communities represented in the graph structure, and then applying a ranking function to identify the most relevant, or most commonly applied, ZT policies.

11. A non-transitory storage medium having stored therein instructions that are executable by one or more hardware processors to perform operations comprising:
    transforming a structured data file into a graph structure that represents a zero trust (ZT) environment, wherein entities in the ZT environment are represented as nodes in the graph structure, and connections between the entities are represented in the graph structure as edges;
    performing a community detection process on the graph structure to identify a community of entities, and the community detection process comprises partitioning the graph structure into sub-graphs that each define a respective community;
    performing a community characterization process that comprises identifying ZT policies that are most relevant, or most commonly applied, to the entities in the community; and
    based on the ZT policies identified, generating a recommendation that one of the ZT policies should be applied to one of the entities in the community and, identifying which ZT policy or ZT policies should be applied.

12. The non-transitory storage medium as recited in claim 11, wherein the community detection process comprises partitioning the graph structure into sub-graph portions that each represent a respective group of the entities in the ZT environment.

13. The non-transitory storage medium as recited in claim 11, wherein the recommendation comprises a recommendation that a particular one of the most relevant, or most commonly applied, policies be applied to an entity to which that particular policy has not yet been applied.

14. The non-transitory storage medium as recited in claim 11, wherein one of the entities comprises any one or more of a user, a device, a network, and an application.

15. The non-transitory storage medium as recited in claim 11, wherein entities within the community are more densely connected to each other than to other entities in a different community.

16. The non-transitory storage medium as recited in claim 11, wherein entities within the community have one or more relationships with each other that comprise one or more system connections, interactions, shared information, and service usage patterns.

17. The non-transitory storage medium as recited in claim 11, wherein a check is performed of the identified ZT policies to determine whether all of the identified ZT policies are in effect across the entities in the community.

18. The non-transitory storage medium as recited in claim 11, wherein the ZT environment represented by the graph structure comprises a network.

19. The non-transitory storage medium as recited in claim 11, wherein, in the structured data file, the nodes are declared before the edges.

20. The non-transitory storage medium as recited in claim 11, wherein the community characterization process comprises visiting the community and one or more other communities represented in the graph structure, and then applying a ranking function to identify the most relevant, or most commonly applied, ZT policies.

* * * * *